UNITED STATES PATENT OFFICE.

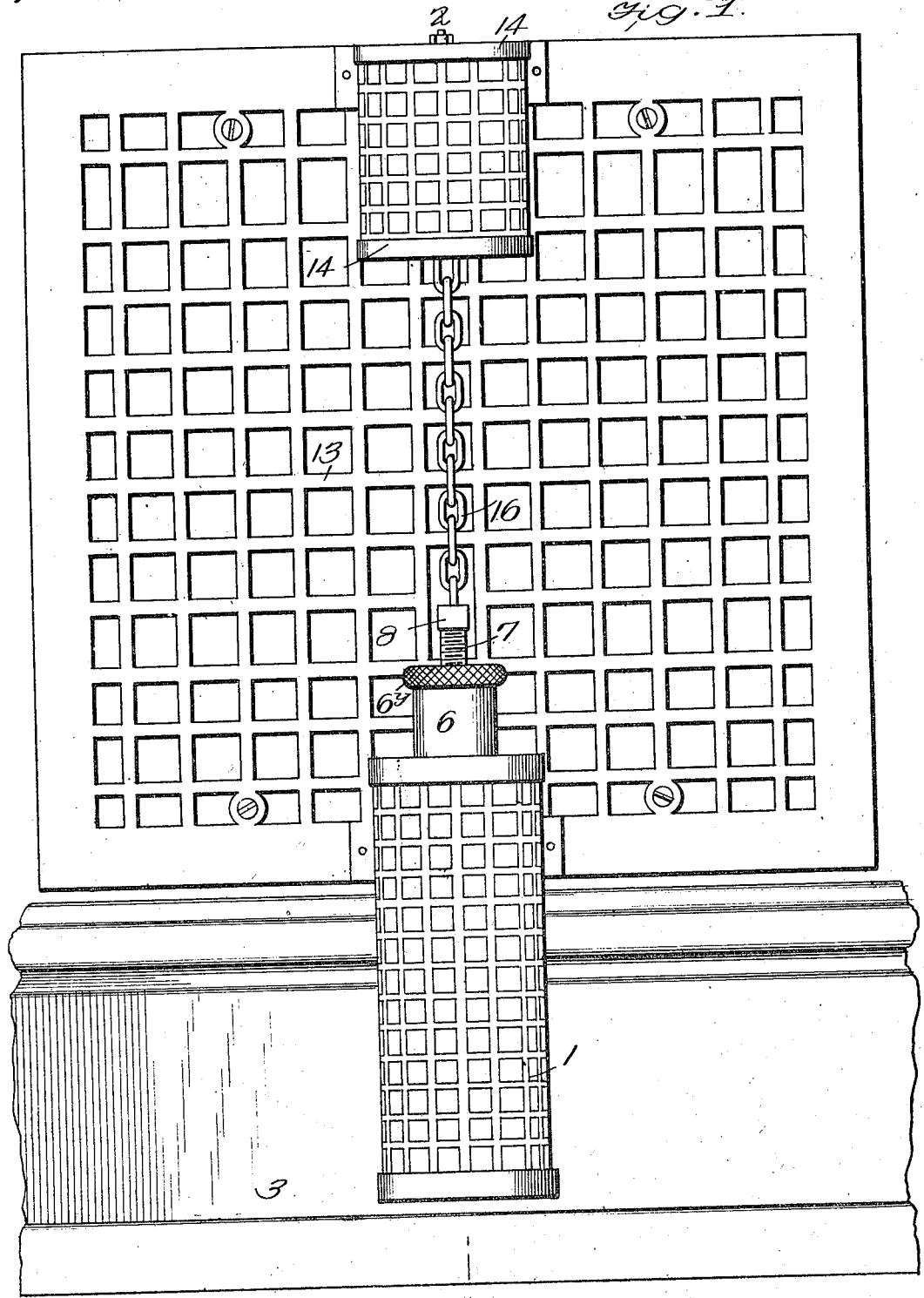

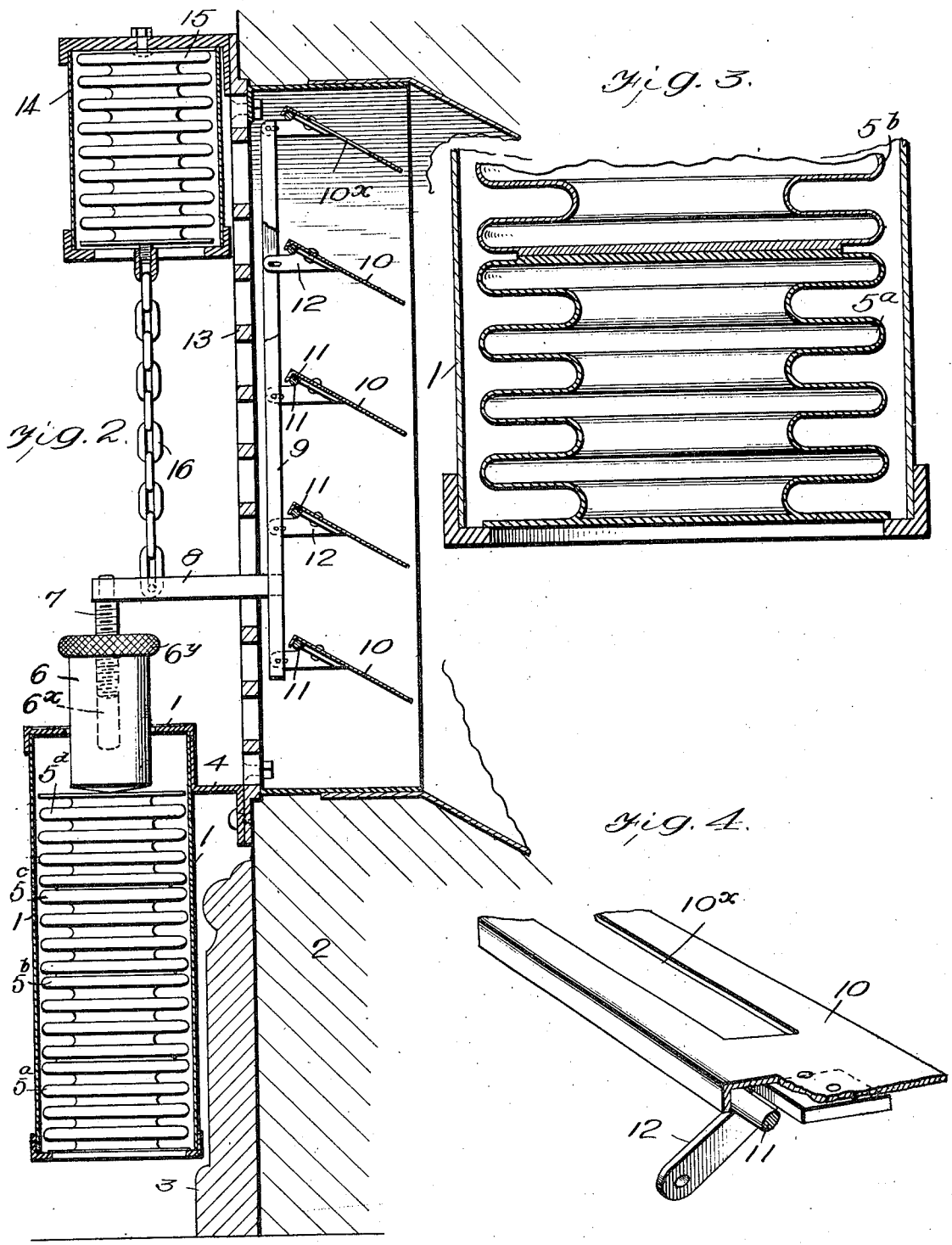

ALBERT P. BROOMELL, OF YORK, PENNSYLVANIA.

THERMOSTATIC MEANS FOR OPERATING HOT-AIR REGISTERS.

1,133,089.

Specification of Letters Patent. Patented Mar. 23, 1915.

Application filed July 7, 1914. Serial No. 849,584.

*To all whom it may concern:*

Be it known that I, ALBERT P. BROOMELL, a citizen of the United States, and a resident of York, in the county of York and State of Pennsylvania, have made certain new and useful Improvements in Thermostatic Means for Operating Hot-Air Registers, of which the following is a specification.

My invention relates to improvements in devices for operating the registers of hot air heating systems and it consists in the combinations, constructions, and arrangements herein described and claimed.

An object of my invention is to provide a simple device which may be used in connection with a hot air heating system which will automatically open and close the register gates.

A further object of my invention is to provide a device of the type described in which a thermostatic member is attached directly to the register gates for operating the same and having means whereby the gates may be opened or closed at predetermined temperatures.

A further object of my invention is to provide an auxiliary thermostat for causing the closure of the register gates in case the fire in the furnace should go out and cold air should come in through the register.

Other objects and advantages will appear in the following specification and the novel features of the device will be particularly pointed out in the appended claims.

My invention is illustrated in the accompanying drawings forming part of this application in which—

Figure 1 is a face view of the device, Fig. 2 is a section along the line 2—2 of Fig. 1, Fig. 3 is an enlarged sectional view through a portion of the lower thermostat, and Fig. 4 is a perspective view of one of the register gates.

In carrying out my invention I provide a casing 1 for the lower thermostat which is secured to the wall 2 just below the face of the register and preferably just above the base board 3 by means of a bracket 4 or in any other suitable way. This casing, as shown in Fig. 1, is preferably in the form of a grating which will permit the free flow of air around the thermostat inclosed therein. The latter is preferably made up of a series of thermostatic members such as those shown at $5^a$, $5^b$, $5^c$ and $5^d$. These sections are set one on top of the other for the purpose of sub-dividing the volatile liquid with which the thermostatic member is charged. I have found that by sub-dividing the bellows into sections the movement of the thermostat is much quicker and more accurate than if one long thermostatic bellows is used. My invention contemplates the use however of any suitable thermostat. Arranged to project through the top of the casing 1 is a weight 6 which has a threaded bore $6^x$ adapted to receive a screw 7 which depends from an arm 8. The knurled head $6^y$ of the weight 6 permits its adjustment on the screw. The arm 8 is attached to a common operating rod 9.

The gates 10 of the register are made of a very light material such as sheet aluminum or thin brass and each gate is pivotally hinged on a brass rod 11 and is provided with an arm 12 having a pivotal connection with the common operating rod 9. The top gate is provided with a cut-away portion $10^x$, the purpose of which will be explained later.

Disposed at the top of the register opening, in front of the grating 13, is a casing 14 which contains an upper thermostatic member 15, the latter being preferably of the bellows type, as shown in the drawings. This thermostatic member 15 is connected with the arm 8 by means of a chain 16. The casing 14 consists preferably of a grating, as shown in Fig. 1 so as to permit the air from the register to play directly on the upper thermostatic member 15.

From the foregoing description of the various parts of the device the operation thereof may be readily understood.

Fig. 3 shows the lower thermostatic member as cold and contracted to its shortest length. If the room temperature increases this thermostat will expand and will carry up with it the weight which is shown resting on the top of the thermostat and this in turn will cause the gates to swing on their pivotal supports so as to close the register or to partially close it, depending upon the amount of expansion of the lower thermostatic member. If it is desired to have the register close later, so that the room will go to a higher temperature, the weight 6 is screwed to the right so as to lift it up from the thermostat thereby necessitating a further movement of the latter before it comes in contact with the weight, thus delaying the closing of the register until the higher temperature is reached. This lower thermostatic member is charged with a volatile liquid in such a manner that it begins expanding at about 65° F.

The upper thermostatic member 14 is charged to begin expanding at about ninety to one hundred degrees F. which temperature is always reached by the incoming warm air. The expansion of the upper thermostatic member has no effect on the register gates, since the chain 16 will be merely slackened up when the upper thermostat is expanded. Let us now assume that the fire in the furnace goes down and that cold air is being discharged through the register. As soon as the temperature of this air drops below the point at which the upper thermostatic member will expand this thermostat will contract and by means of the chain connection will pull the bar 8 and the weight 6 upwardly, thus closing the register and preventing the admission of cold air so long as the air in the register chamber is cold. When, however, the warm air begins to come in, the upper thermostatic member will begin to expand.

In order that the register gates may be opened at the initial entrance of the warm air I provide a cut-away portion 10$^x$ in the upper gate so that even when the latter is closed the hot air may flow through and thus quickly warm the upper thermostat, so as to cause its expansion and thereby permit the opening of the register gates through the downward movement of the weight 6.

It will thus be seen that I have provided a device having register gates which are positively operated by the movement of an individual thermostat connected with the gates so as to control the temperature of the room and in addition have provided an auxiliary thermostatic member for closing the gates when there is an abnormal decrease of temperature, as for instance when the fire goes out. This automatic regulation therefore provides for all the ordinary contingencies which may occur in the regulation of the temperature of a hot air heating system.

I claim:

1. In a hot air heating system, a register provided with gates, a thermostatic member connected with said gates for operating the latter at predetermined temperature, and an auxiliary thermostatic member acting independently of said first-named thermostatic member for operating the register gates at an abnormally low temperature.

2. In a hot air heating system, a register provided with gates, a thermostat connected with said gates for causing the latter to open below a predetermined room temperature and to close at a higher temperature, and an auxiliary thermostatic member for causing the closing of the register gates below the operating temperature of the first mentioned thermostatic member.

3. In a hot air heating system, a register provided with gates, a thermostat connected with said gates for causing the latter to open below a predetermined room temperature and to close at a higher temperature, and an auxiliary thermostatic member acting independently of said first-named thermostatic member for causing the closing of the register gates when cold air is passing out through the register.

4. In a hot air heating system having a register provided with pivoted gates, a common operating rod for moving said pivoted gates, a counterweight secured to said common operating rod, a thermostatic bellows disposed below said counterweight and arranged to engage the latter in its movement under expansion, the position of said counter weight being adjustable with respect to said thermostatic bellows.

5. In a hot air heating system, a register provided with movable gates, a thermostat disposed below the register and being operatively connected with said gates for opening and closing the latter at a predetermined temperature, and an auxiliary thermostat disposed in front of the register in the path of the incoming hot air, said auxiliary thermostat being operatively connected with the register gates for closing the latter when cold air is coming through the register.

6. In a hot air heating system, a register provided with pivoted gates, an operating rod for said pivoted gates, a counterweight carried by said common operating rod, a thermostatic member disposed below the register and arranged to engage said counterweight in its movement for opening and closing the gates at a predetermined temperature, an auxiliary thermostatic member disposed in front of the register in the path of the air coming through the register, and a flexible connection between said counterweight and said auxiliary thermostatic member, the contraction of said auxiliary member serving to raise the counterweight.

7. In a hot air heating system, a register provided with gates, a main thermostatic member, an auxiliary thermostatic member acting in conjunction with said main thermostatic member for operating the gates at a predetermined temperature, said auxiliary thermostatic member acting independently of said main thermostatic member for operating the gates at an abnormally low temperature.

ALBERT P. BROOMELL.

Witnesses:
E. PHILIP STAIR,
ANDREW J. HERSHEY.